US006976658B2

(12) United States Patent  (10) Patent No.: US 6,976,658 B2
Sekikawa et al.  (45) Date of Patent: Dec. 20, 2005

(54) COCKPIT DOOR OF AIRCRAFT

(75) Inventors: Yasuo Sekikawa, Tokyo (JP);
Toshihisa Kasuya, Tokyo (JP); Tadashi Watanabe, Tokyo (JP)

(73) Assignee: Jamco Corporation, Tokyo (JP)

( * ) Notice: Subject to any disclaimer, the term of this patent is extended or adjusted under 35 U.S.C. 154(b) by 0 days.

(21) Appl. No.: 10/747,309

(22) Filed: Dec. 30, 2003

(65) Prior Publication Data

US 2004/0195456 A1  Oct. 7, 2004

(30) Foreign Application Priority Data

Feb. 14, 2003 (JP) .............................. 2003-035958

(51) Int. Cl.⁷ ................................................ B64C 1/14
(52) U.S. Cl. ................................. 244/118.5; 244/129.5
(58) Field of Search ............................ 244/118.5, 121, 244/129.5; 109/11, 49.5; 89/36.02; 428/105

(56) References Cited

U.S. PATENT DOCUMENTS

| 3,704,845 | A | | 12/1972 | Ord ............................ 244/121 |
| 4,748,790 | A | * | 6/1988 | Frangolacci ............... 52/794.1 |
| 5,060,582 | A | * | 10/1991 | Salzer ........................ 109/49.5 |
| 5,463,929 | A | * | 11/1995 | Mejia ......................... 89/36.02 |
| 6,474,599 | B1 | | 11/2002 | Stomski |
| 6,562,435 | B1 | * | 5/2003 | Brillhart et al. ............ 428/105 |
| 6,702,230 | B2 | * | 3/2004 | Movsesian et al. ....... 244/118.5 |
| 2003/0114064 | A1 | * | 6/2003 | Fu et al. ..................... 442/239 |

FOREIGN PATENT DOCUMENTS

| CH | 664 408 | 2/1988 |
| DE | 198 56 250 | 3/2000 |

* cited by examiner

Primary Examiner—Galen Barefoot
(74) Attorney, Agent, or Firm—Westerman, Hattori, Daniels & Adrian, LLP

(57) ABSTRACT

A cockpit door comprises a hinge 20 provided to one surface and a latch device provided to the other side that can be operated only from the cockpit side. To the inside of a door panel is disposed a reinforcement member 110 formed by laminating multiple layers of sheets with thermoplastic adhesives, the sheets formed by laminating aromatic polyamide fiber onto a honeycomb panel and processing the same into sheet form. A titanium alloy reinforcement plate 400 is disposed to cover the gap $G_1$ between the door body and flap 60. Mounting portions 150 and 160 are provided to the rim of the reinforcement member body 110, and rivet holes 180 are provided thereto. The mounting portion is bent 90 degrees and fixed to the frame by rivets.

2 Claims, 12 Drawing Sheets

FIG. 16
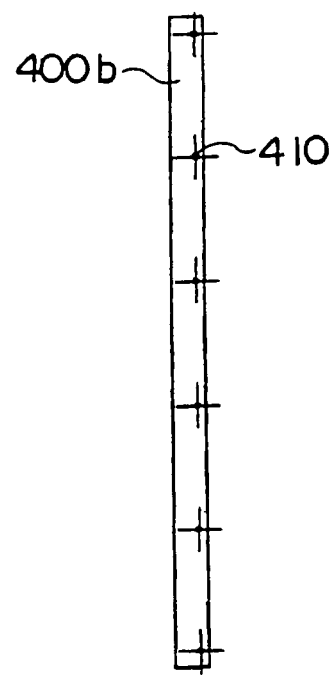
FIG. 17
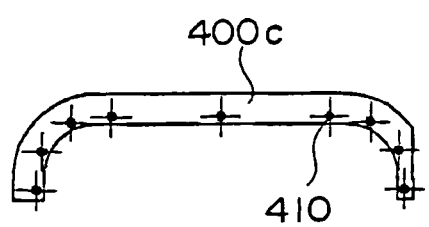
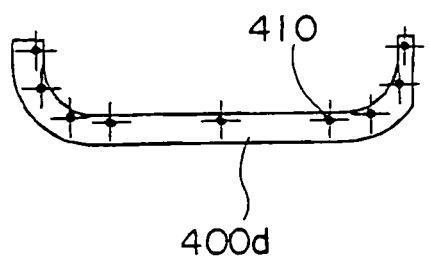

COCKPIT DOOR OF AIRCRAFT

FIELD OF THE INVENTION

The present invention relates to a cockpit door of an aircraft that is disposed between a cockpit and a passenger cabin of the aircraft.

DESCRIPTION OF THE RELATED ART

Currently, there exists a growing demand for the enhancement of strength of the cockpit door of aircrafts to counter the recent terrorist attacks attempted on aircrafts, and various countermeasures are being proposed.

For example, the following patent document discloses a system for increasing the security of an aircraft by providing an isolated chamber between the cockpit and the passenger cabin.

Patent Document 1: U.S. Pat. No. 6,474,599

In the system disclosed in the above-mentioned publication, there is a need to secure a space for building the chamber between the cockpit and the passenger cabin, by which the effective space of the cabin is reduced.

SUMMARY OF THE INVENTION

Therefore, the present invention provides a cockpit door having the strength of the overall cockpit door increased so as to enhance the security of the aircraft, and also having a means for communicating the cockpit with the cabin and providing a means for the pilots to escape in case of decompression of the cabin during which the pressure within the cabin is reduced rapidly.

In order to solve the problem, the cockpit door according to the present invention comprises a reinforcement member fixed to an inner portion of the door, the reinforcement member having a body formed by integrating via hot pressing multiple layers of aromatic polyamide fiber sheets having thermoplastic adhesive bonded thereto by pressure, and a mounting portion provided to a rim portion of the body, the mounting portion bent 90 degrees and fixed to position via rivets; and a reinforcement plate for covering a gap formed between the door and a structural member disposed around the door. The cockpit door of an aircraft further comprises a flap disposed to an inner side of the door and capable of opening and closing via a hinge, the flap having a reinforcement member secured to an inner portion of the flap, the reinforcement member having a body formed by integrating via hot pressing multiple layers of aromatic polyamide fiber sheets having thermoplastic adhesive bonded thereto by pressure, and a mounting portion provided to a rim portion of the reinforcement member body, the mounting portion bent 90 degrees and mounted to position via rivets; and a reinforcement plate for covering a gap formed between the flap and the door. According further to the cockpit door of an aircraft, the reinforcement plate is a plate member made of titanium alloy.

BRIEF DESCRIPTION OF THE DRAWINGS

FIG. 16 is an explanatory view of the reinforcement plate; and

FIG. 17 is an explanatory view of the reinforcement plate.

DETAILED DESCRIPTION OF THE PREFERRED EMBODIMENT

Figure 1:
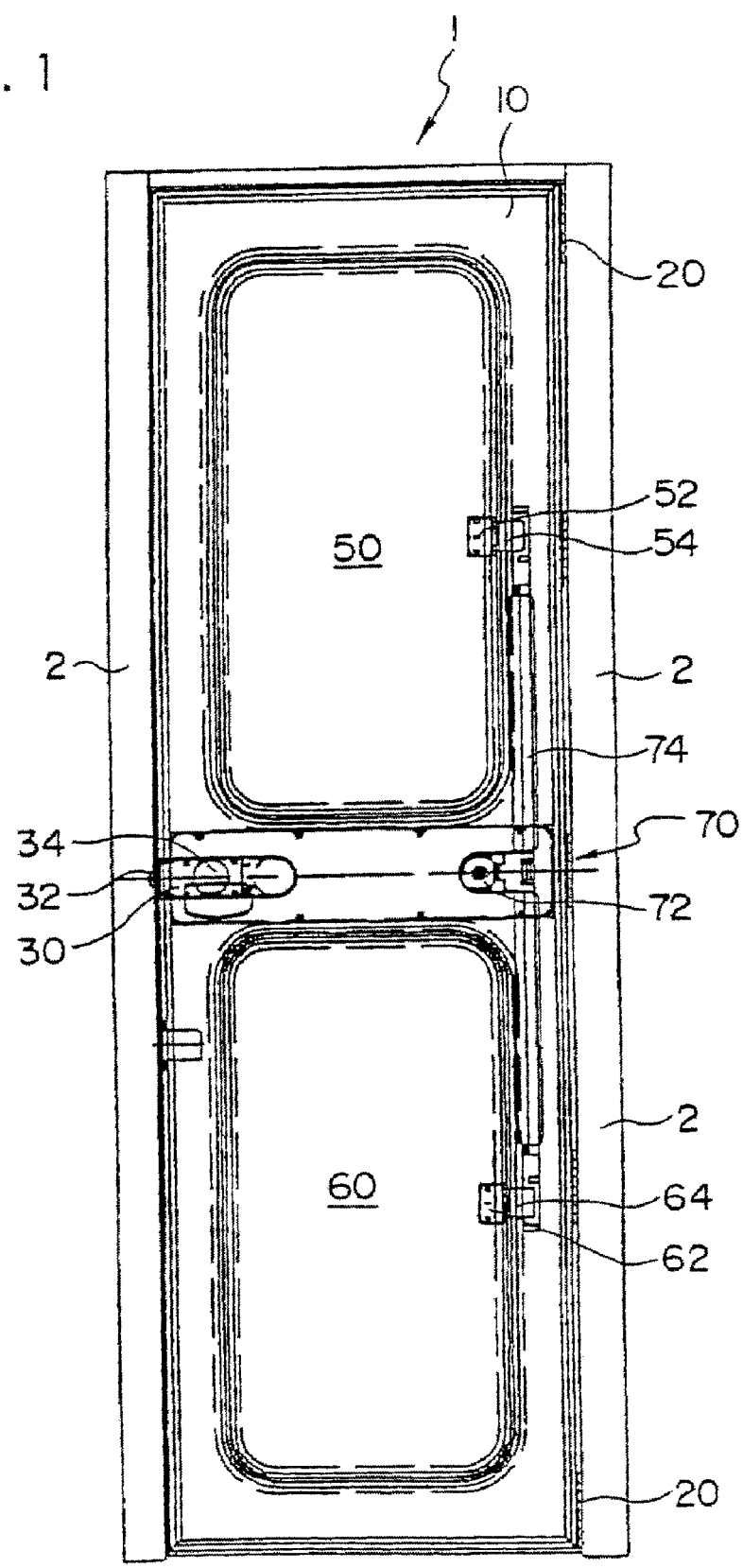
FIG. 1 is a front view showing the cockpit door of the present invention.
Figure 2:
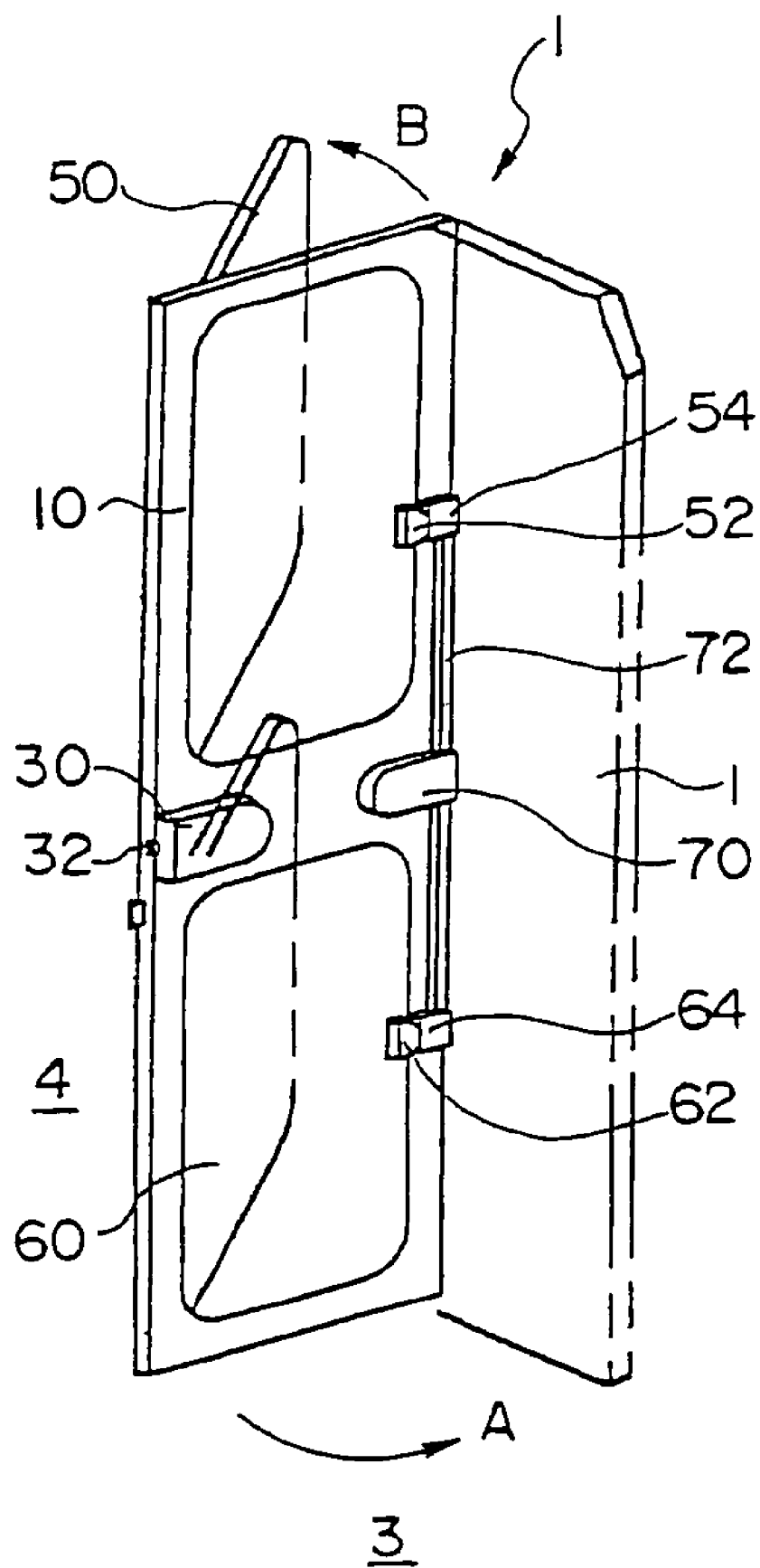
FIG. 2 is an explanatory view showing the operation of the cockpit door of the present invention.
Figure 3:
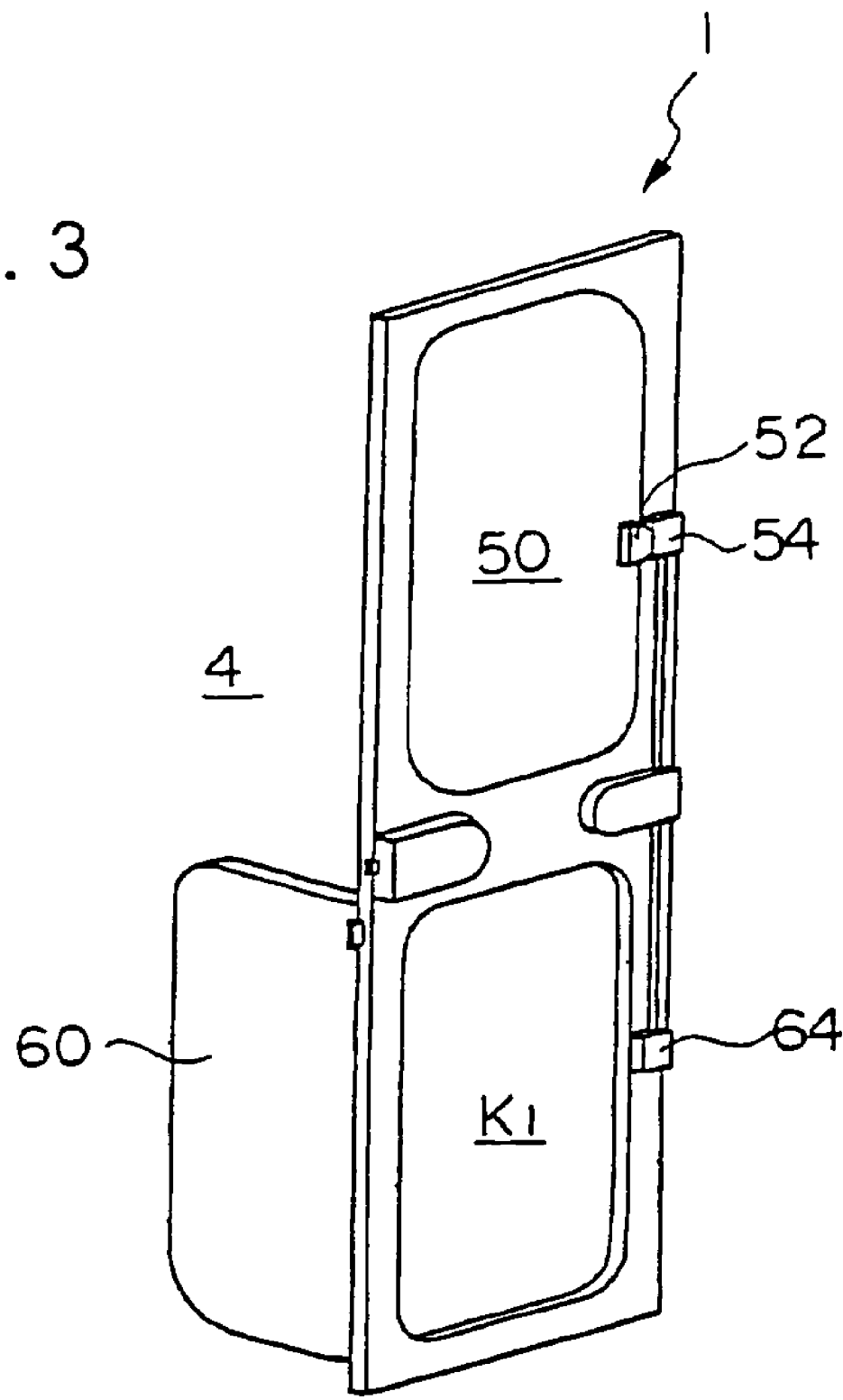
FIG. 3 is an explanatory view showing the operation of the cockpit door of the present invention.

FIG. 1 is a front elevational view showing the cockpit door according to the present invention from the cockpit side, and FIGS. 2 and 3 are explanatory views showing the action of the cockpit door.

The cockpit door, the whole of which being designated by reference number 1, is fixed in a single swinging fashion to a frame 2 disposed on an opening formed to a partition wall for separating the cockpit from the passenger cabin.

The cockpit door 1 comprises a door body 10, and two small doors (hereinafter called flaps) 50 and 60 disposed vertically on the door body 10.

The door body 10 is equipped with a latch device 30 disposed on the side of the door facing the cockpit, and by operating a handle 34, a bolt 32 is engaged with or released from a catch (not shown) provided to the frame 2.

The door body 10 is fixed to the frame 2 via four hinges 20, by which the door is enabled to open only toward the cockpit 3, as shown by arrow A of FIG. 2.

The two flaps 50 and 60 are secured to the door body 10 by hinges not shown, and can only be opened toward the cabin as shown by arrow B.

The first flap 50 comprises a catch 52 disposed on the side rim portion thereof opposite from the hinge, and the catch 52 engages with a latch 54 disposed on the door body 10.

During normal state, the latch 54 is engaged with the catch 52, and the flap 50 is closed.

Similar to the first flap 50, the second flap 60 also comprises a catch 62 disposed on the side rim portion thereof opposite from the hinge, which can be engaged with a latch 64 disposed on the corresponding portion of the door body 10. During normal state, the latch 64 is engaged with the catch 62, and the flap 60 is closed.

The door body 10 is equipped with a pressure sensitive device 70.

The pressure sensitive device 70 comprises a piston 72 that is actuated by the change in air pressure, and the movement of the piston 72 is transmitted through a rod 74 and causes the movement of latches 54 and 64 disposed on upper and lower ends of a rod 74. When the latches 54 and 64 are actuated, they are released from the engagement with the catches 52 and 62.

When decompression occurs in the passenger cabin 4, the pressure sensitive device 70 senses the rapid fall of pressure, and releases the engagement between the latch and the catch so that the two flaps can open toward the side of the cabin 4 to thereby reduce the difference in pressure between the cabin and the cockpit.

The second flap 60 can also be opened manually by a crew member operating the latch 64, even if the cabin is not in a decompressed state.

Therefore, even if the cockpit door body 10 is stuck and cannot be opened by some reason, the crew member in the cockpit can go through an opening $K_1$ created by the opening of the second flap 60 and escape into the cabin 4. The cockpit door 1 according to the present invention comprises the basic structure as explained above.

Figure 4:
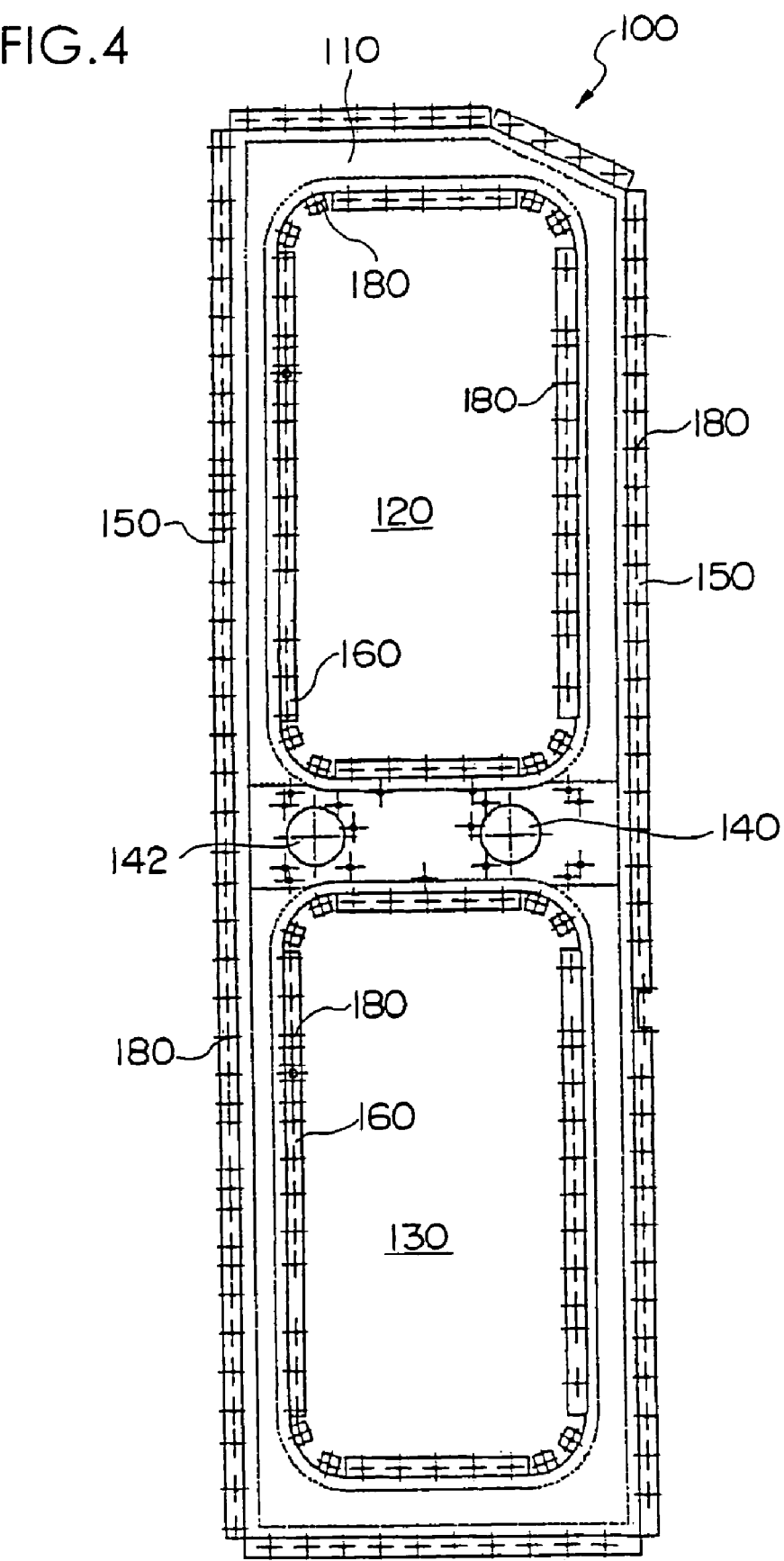
FIG. 4 is a front view showing the reinforcement member of the door body of the present cockpit door.

FIG. 4 is an explanatory view showing the structure of a reinforcement member fixed to an interior portion of the door body 10.

The reinforcement member, the whole of which being designated by reference number 100, comprises a body 110 formed by laminating and bonding together multiple layers of aromatic polyamide fiber sheets.

This fiber sheet is lightweight but has high strength, and can be used for fabricating flak jackets or the like.

Thermoplastic adhesive is applied to the fiber sheets via hot pressing to create a reinforcement member body 110. A number of fiber sheets, for example, 20 sheets, are laminated to ensure the required strength.

Instead of laminating 20 layers of fiber sheets at once, the complete laminated body can be formed by first creating a laminated body comprising five layers of fiber sheets, and then laminating four of these five-layer laminated bodies to acquire the reinforcement member body 110.

The reinforcement member body 110 comprises openings 120 and 130 corresponding to where flaps are located, and openings 140 and 142 corresponding to where the open/close mechanism of the door is to be disposed.

To the outer rim of the body 110 is formed a mounting portion 150 used for fixing the body 110 to the structural member (not shown) of the door. Similarly, amounting portion 160 is formed to the inner rim portion of the body 110. The mounting portions 150 and 160 are formed by reducing the number of layers of fiber sheets being laminated.

Mounting holes 180 for inserting rivets are formed to the mounting portions 150 and 160 with predetermined intervals.

The heat-treated body 110 has extremely high strength, but in the next step, the fixing portions 150 and 160 of the body 110 are bent 90 degrees via machining.

Figure 5:
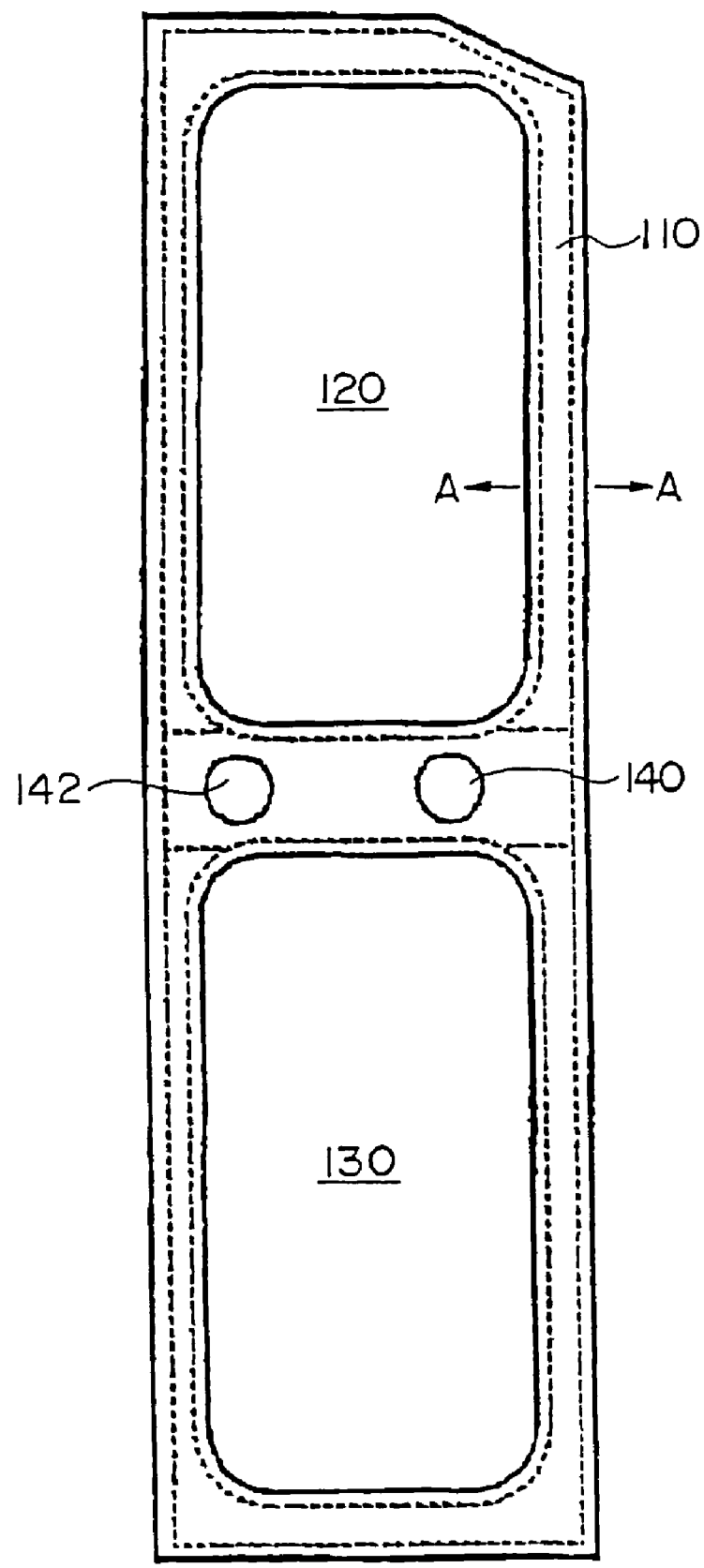
FIG. 5 is a front view showing the reinforcement member of the door body of the present cockpit door.
Figure 6:
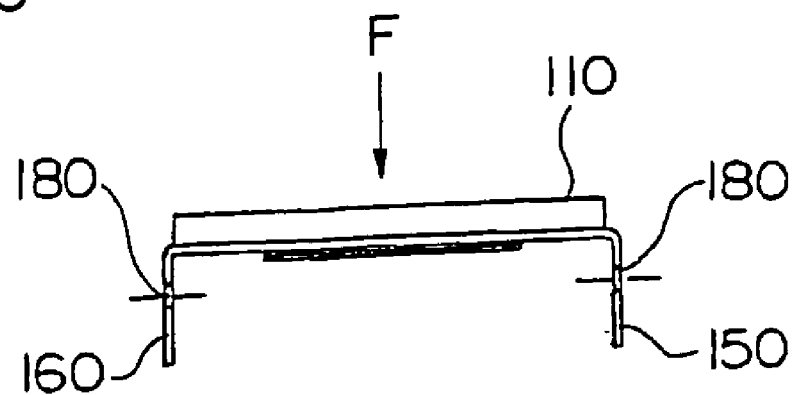
FIG. 6 is a cross-sectional view taken at A—A of FIG. 5.

FIG. 5 is a plan view of the member 110 in which the fixing portions are bent, and FIG. 6 is a cross-sectional view taken at arrow A—A of FIG. 5.

The reinforcement member body 110 is manufactured by laminating a number of fiber sheets, and the mounting portions 150 and 160 are formed by reducing the number of laminated sheets.

Holes 180 for inserting rivets are provided in advance to the mounting portions 150 and 160. Through use of these rivet holes 180, the reinforcement member 110 is fixed to a door frame not shown.

The rivets are inserted in the direction parallel to the planar surface of the member 110. Therefore, when impact force F in the perpendicular direction is loaded on the surface of the member 110, each rivet receives force acting in the shearing direction. Since the rivets have higher endurance against the load in the shearing direction than against the load in the axial direction, the above-explained mounting structure enables the reinforcement member to exert sufficient strength.

Figure 7:
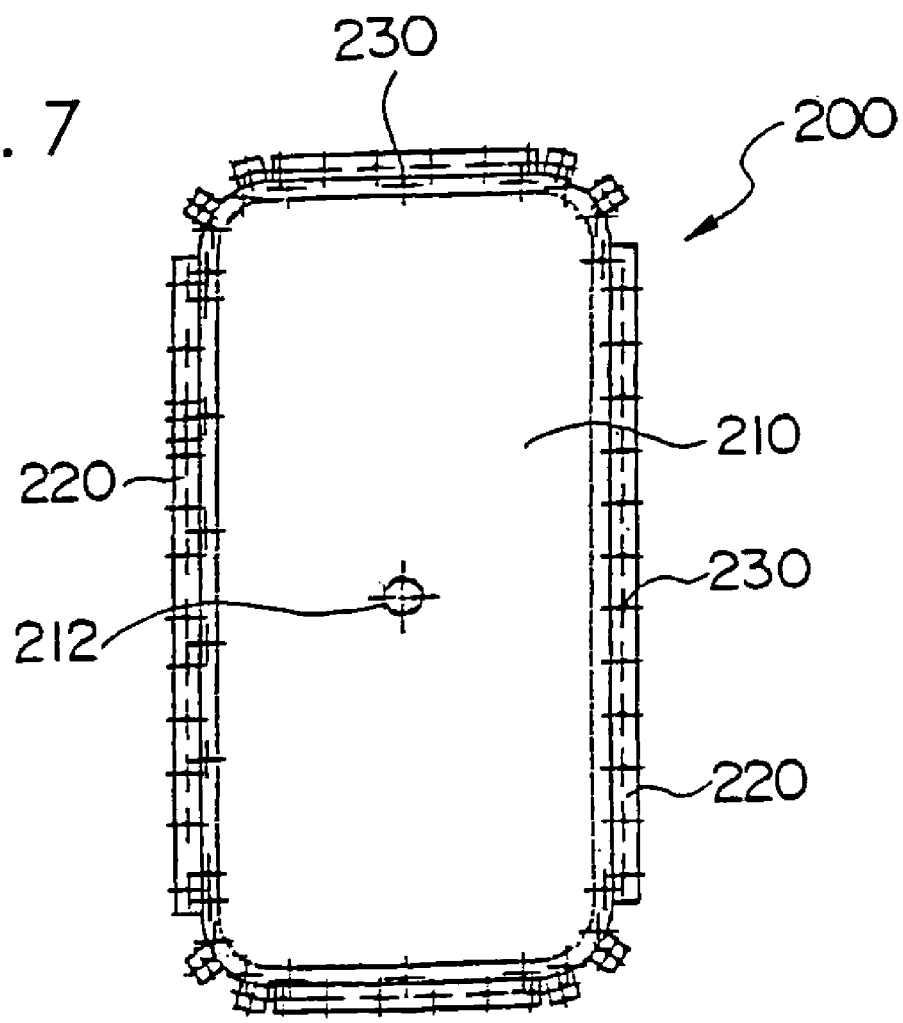
FIG. 7 is a front view showing the reinforcement member of the flap of the present cockpit door.

FIG. 7 is a plan view of a flap reinforcement member to be fixed to the inner portion of the flap mounted on the cockpit door.

A reinforcement member body 210 of the flap reinforcement member 200 is also formed by laminating around 20 layers of aromatic polyamide fiber sheets and subjecting the multilayered body to hot pressing.

The body 210 is equipped with a necessary opening 212 and a mounting portion 220 formed to the outer rim area thereof. A number of rivet inserting holes 230 are machined to the mounting portion 220.

Figure 8:
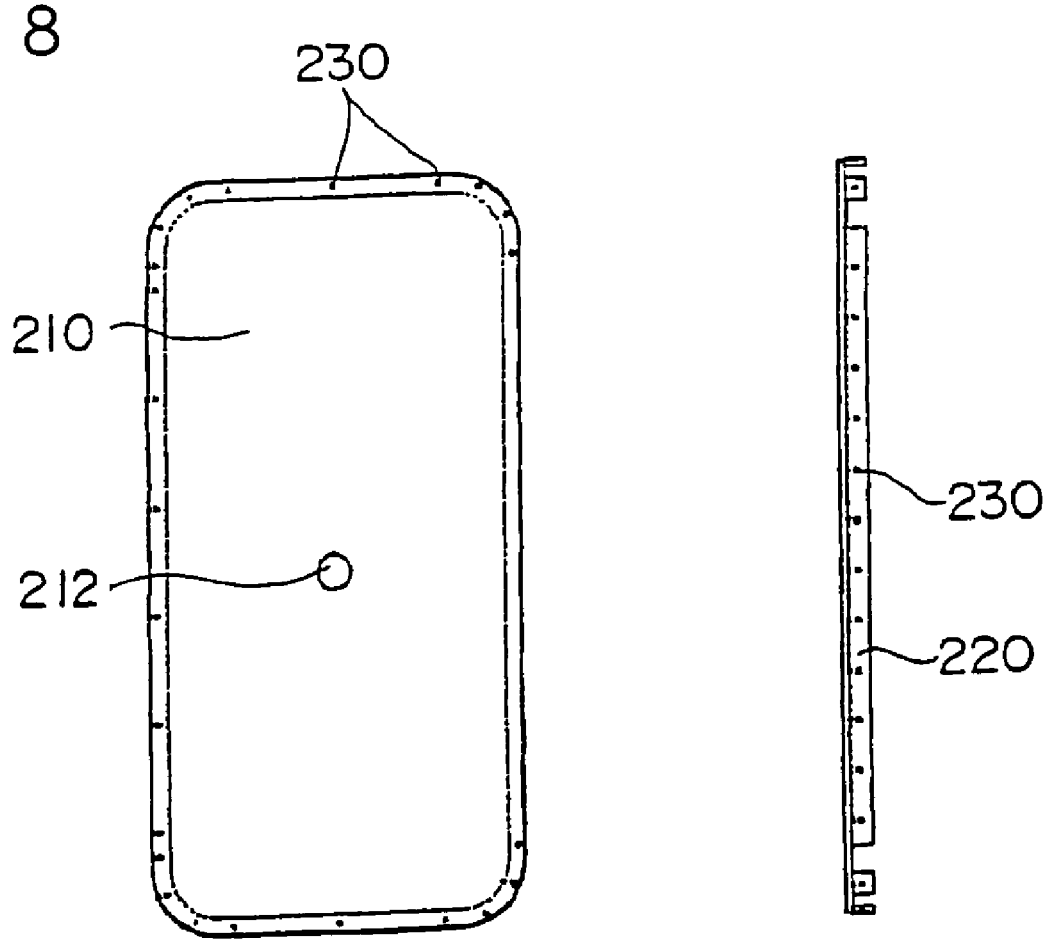
FIG. 8 is a front view and a side view of the reinforcement member of the flap of the present cockpit door.

FIG. 8 illustrates a state in which the mounting portion 220 is bent 90 degrees.

Figure 9:
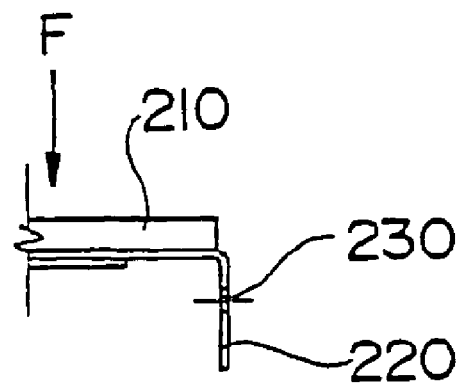
FIG. 9 is a cross-sectional view of FIG. 8.

As shown in FIG. 9, the mounting portion 220 bent perpendicularly is positioned to cover the frame of the flap, and thereafter, rivets are inserted to the holes 230 so as to secure the flap reinforcement member to the flap.

According to this structure, when a load in the direction of arrow F is placed on the reinforcement member of the flap, the rivets receive shearing force and exert sufficient durability.

Figure 10:
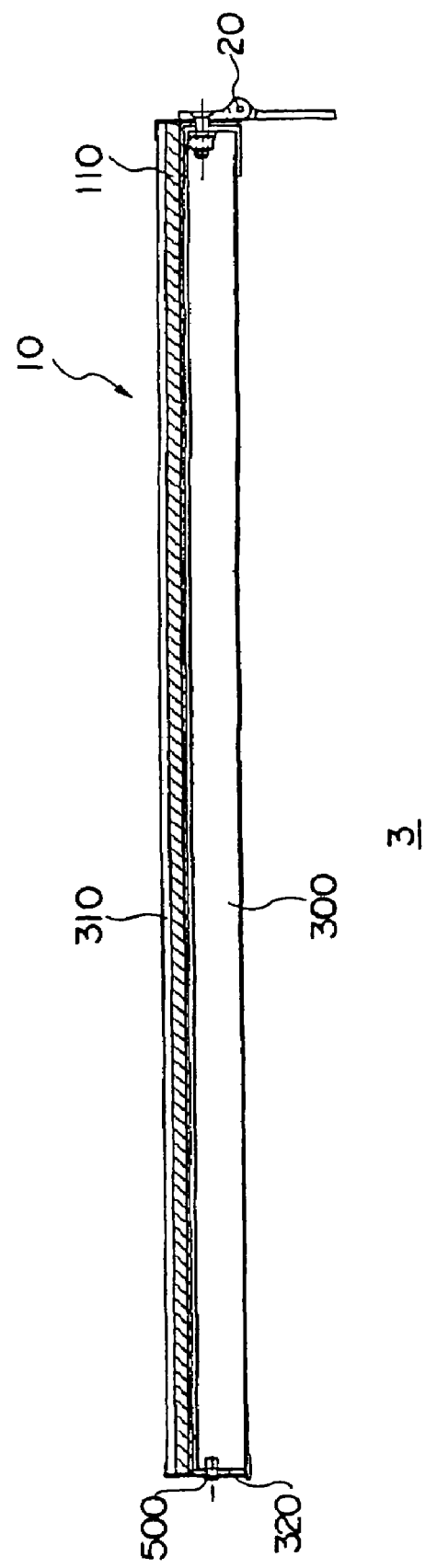
FIG. 10 is a cross-sectional view of the cockpit door of the present invention.

FIG. 10 is a cross-sectional view of the cockpit door. The door body 10 comprises a reinforcement member 110 formed by laminating aromatic polyamide fiber sheets and integrating the same by hot pressing, a honeycomb panel 300 disposed on the cockpit 3 side of the reinforcement member 110, and a surface plate 310 disposed on the cabin 4 side of the reinforcement member 110. The reinforcement member 110 is fixed to the frame member 320 via rivets 500.

A hinge 20 is fixed to one side rim of the door body 10 enabling the cockpit door to be opened toward the cockpit 3 side.

Figure 11:
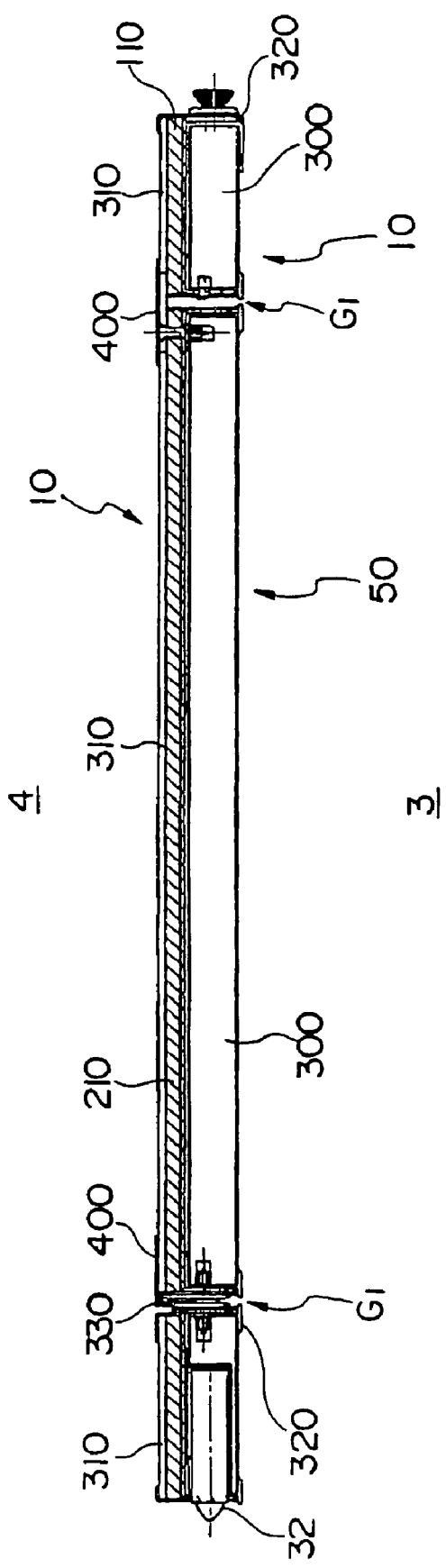
FIG. 11 is a cross-sectional view of the cockpit door of the present invention.

FIG. 11 is a cross-sectional view of the door body taken at a plane including the first flap 50.

Similar to the door body, the first flap 50 is also composed of a reinforcement member 210 having a honeycomb panel 300 disposed on one side and a surface plate 310 disposed on the other side.

The first flap 50 is secured via a hinge 330 that allows it to be opened toward the cabin 4.

A gap $G_1$ exists between the first flap 50 and the door body 10.

Figure 12:
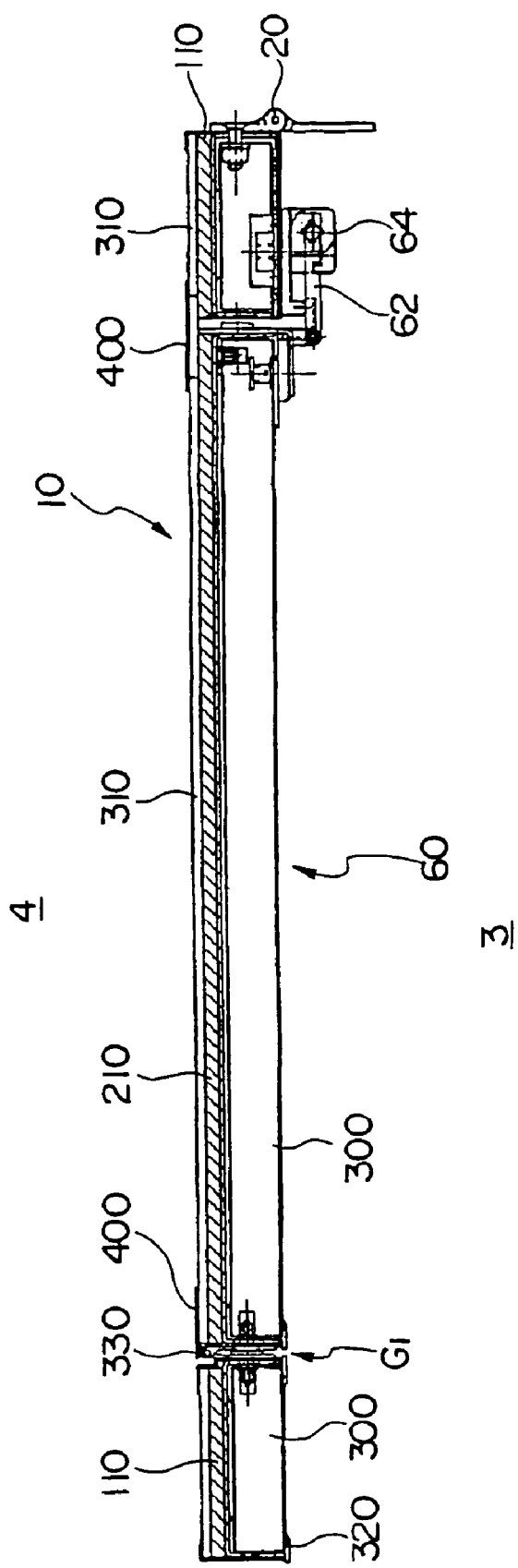
FIG. 12 is a cross-sectional view of the cockpit door of the present invention.

FIG. 12 is a cross-sectional view of the door body taken at a plane including the second flap 60.

Similarly, the second flap 60 is composed of a reinforcement member 210 having a honeycomb panel 300 disposed on one side and a surface plate 310 covering the other side.

The second flap 60 can also be opened toward the cabin 4 side via a hinge 330. The second flap 60 is normally closed, with the latch 64 operated via a pressure sensitive device engaged with the catch 62. By operating the latch 64 from the cockpit side, the second flap 60 can be opened toward the cabin even if the pressure sensitive device is not activated.

A gap $G_1$ exists also between the second flap 60 and the door body 10.

The cockpit door of the present invention is equipped with a reinforcement plate for covering and protecting the gap formed between the door body and the flap.

Figure 13:
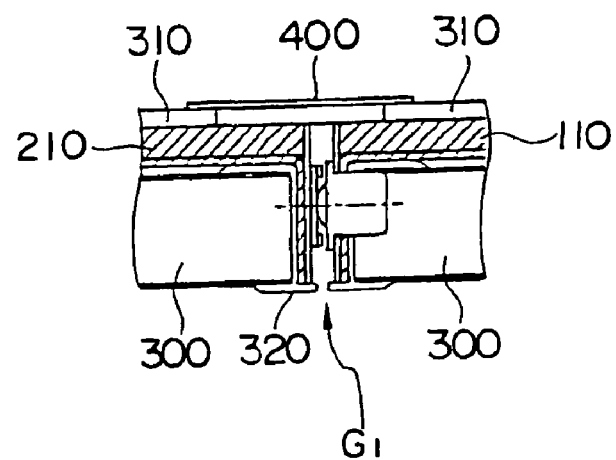
FIG. 13 is a detailed cross-sectional view of members.
Figure 14:
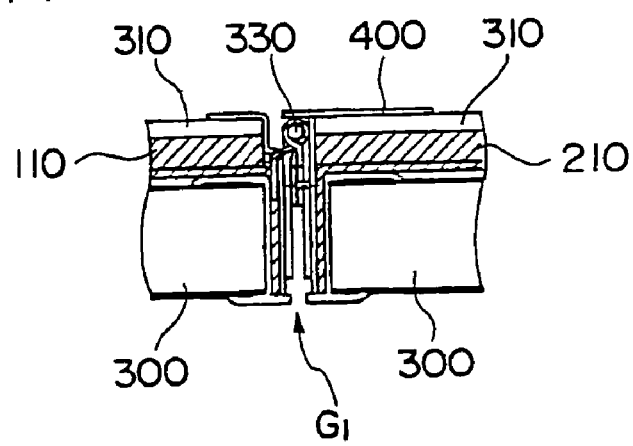
FIG. 14 is a detailed cross-sectional view of members.

As shown in FIGS. 13 and 14, a reinforcement plate 400 is secured onto the upper surface of the face plate 310 facing the cabin side of the cockpit door, so as to close and cover the gap.

The reinforcement plate 400 is made of metal having high strength such as titanium alloy, and various shapes and structures are prepared to correspond to the shapes and locations of the corresponding gap $G_1$.

Figure 15:
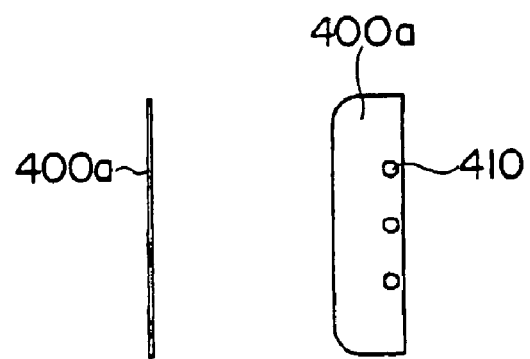
FIG. 15 is an explanatory view of the reinforcement plate.

A reinforcement plate 400a shown in FIG. 15 is to be fixed on the upper surface of the hinge 330, and is provided with rivet holes 410 for securing the plate to position.

A reinforcement plate 400b shown in FIG. 16 is a long thin plate for covering the linear gap formed between the flap and door body, and is provided with rivet holes 410.

Reinforcement plates 400c and 400d shown in FIG. 17 are plates for covering the gaps formed to the upper and lower rim portions of the flap, having curved portions corresponding to the shape of the flap and are provided with rivet holes 410.

As explained, the present invention provides a cockpit door to be interposed between the cabin and the cockpit of an aircraft that comprises a door body having an extremely high strength with a cross-sectional structure formed by laminating a honeycomb panel and a surface plate on either sides of a reinforcement member formed by laminating aromatic polyamide fiber sheets and subjecting the same to hot pressing.

Further, the door body has opening portions to which are disposed flaps that open by the decompression of the cabin or that provide an escape route for the pilots. A titanium alloy reinforcement plate is secured to cover the gap formed between the door body and the flaps, by which the strength of the whole door is further enhanced.

What is claimed is:

1. A cockpit door disposed between a passenger cabin and a cockpit of an aircraft, the cockpit door comprising:
    a reinforcement member fixed to an inner portion of the door, the reinforcement member having a body formed by integrating via hot pressing multiple layers of aromatic polyamide fiber sheets having thermoplastic adhesive bonded thereto by pressure, and a mounting portion provided to a rim portion of the body, the mounting portion bent 90 degrees and fixed to position via rivets; and
    a reinforcement plate for covering a space between the door body and frame surrounding the door, the reinforcement plate being a plate member made of titanium alloy.

2. The cockpit door of an aircraft according to claim 1, wherein the door further comprises a flap disposed on an inner side of the door and capable of opening and closing via a hinge, the flap having a reinforcement member secured to an inner portion of the flap, the reinforcement member having a body formed by integrating via hot pressing multiple layers of aromatic polyamide fiber sheets having thermoplastic adhesive bonded thereto by pressure, and a mounting portion provided to a rim portion of the reinforcement member body, the mounting portion bent 90 degrees and mounted to position via rivets; and a reinforcement plate for covering a gap formed between the flap and the door.

* * * * *